United States Patent [19]
Campbell

[11] Patent Number: 5,868,990
[45] Date of Patent: Feb. 9, 1999

[54] INJECTION MOLDING PARTS WITH PINHOLES

[75] Inventor: Michael T. Campbell, Grand Rapids, Mich.

[73] Assignee: Cascade Engineering, Inc., Grand Rapids, Mich.

[21] Appl. No.: 502,275

[22] Filed: Jul. 13, 1995

[51] Int. Cl.$^6$ .............................. B29C 45/26; B29C 33/42
[52] U.S. Cl. .............. 264/328.12; 249/149; 264/328.16; 425/577
[58] Field of Search ............................ 264/328.12, 328.1, 264/328.8, 328.16; 249/63, 64, 144, 149; 425/552, 577, 468

[56] References Cited

U.S. PATENT DOCUMENTS

| | | | |
|---|---|---|---|
| 1,785,797 | 12/1930 | Watson | 249/64 |
| 2,151,131 | 3/1939 | McWane | 249/63 |
| 4,021,515 | 5/1977 | Neuman . | |
| 4,140,828 | 2/1979 | Copping | 264/328.12 |
| 4,248,823 | 2/1981 | Bader et al. | 249/64 |
| 4,434,120 | 2/1984 | Aloisio, Jr. et al. | 264/328.8 |
| 5,147,657 | 9/1992 | Giza . | |
| 5,167,898 | 12/1992 | Luther . | |
| 5,174,910 | 12/1992 | Pita . | |
| 5,419,865 | 5/1995 | Ogata et al. | 264/328.1 |

FOREIGN PATENT DOCUMENTS

| | | | |
|---|---|---|---|
| 60-82311 | 5/1985 | Japan | 264/154 |
| 61-197229 | 9/1986 | Japan | 264/154 |

*Primary Examiner*—Jill L. Heitbrink
*Attorney, Agent, or Firm*—Rader, Fishman, Grauer & Mc Garry

[57] ABSTRACT

A mold for molding thermoplastic parts having a plurality of pinholes wherein at least one of the mold cavities has a number of projections in the form of three-dimensional tapering shapes, for example, cones, which extend to a point near to but spaced from the confronting surface of the other mold half cavity. The taper of the angle of the projection and spacing between the apices of the projection and the surface of the other mold half are selected so that molten thermoplastic freezes before it covers the apices of the projections during the molding process to thereby form pinholes in the resulting plastic part. A method for molding plastic parts with pinholes with the use of the mold cavity with multiple projections is also disclosed.

16 Claims, 1 Drawing Sheet

U.S. Patent     Feb. 9, 1999     5,868,990
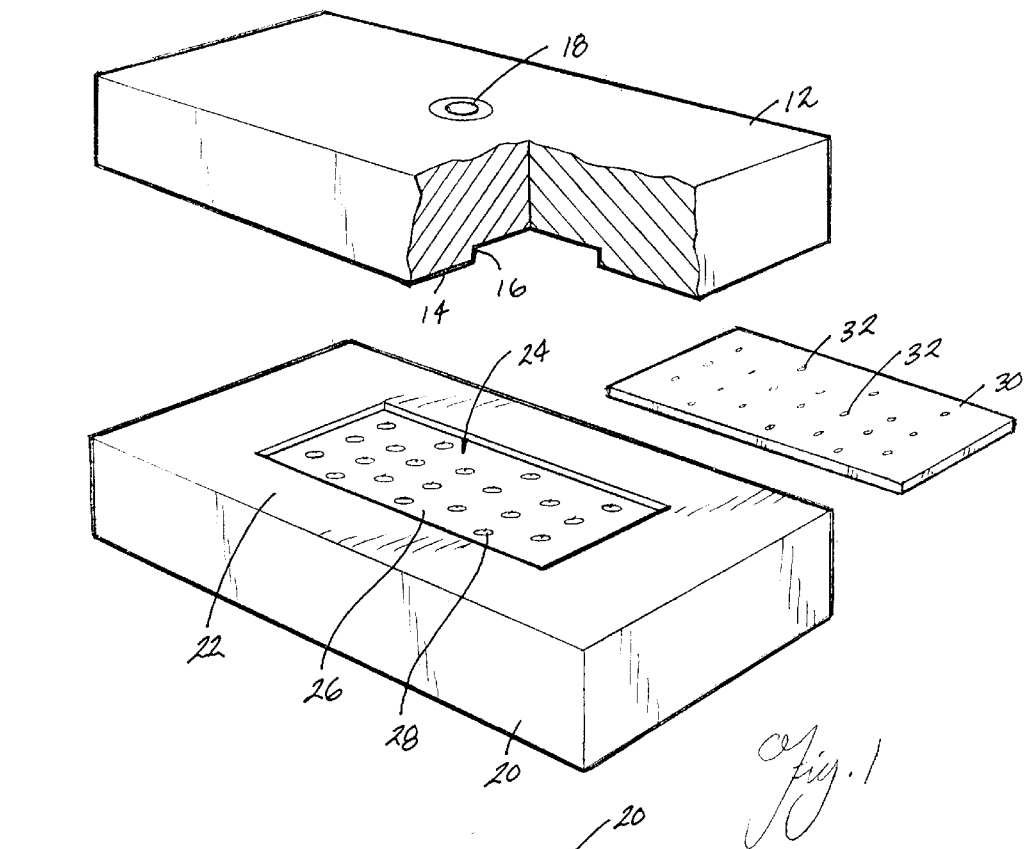
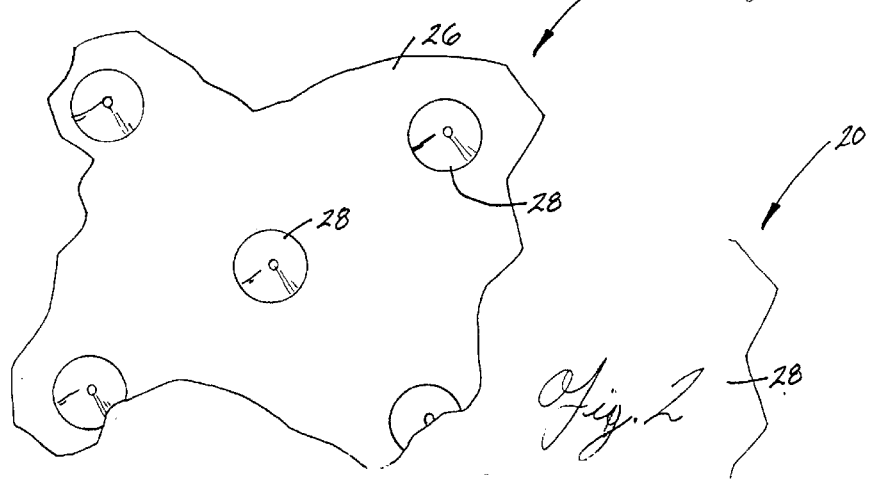
Fig. 2
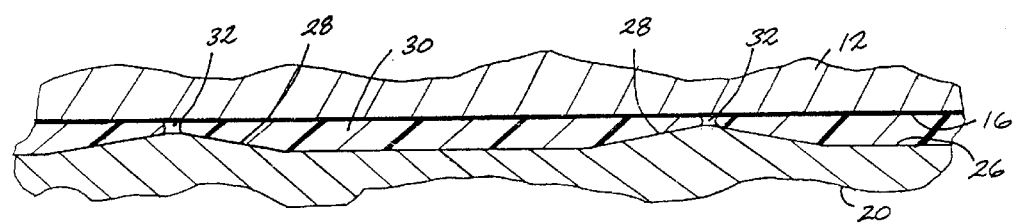
Fig. 3

INJECTION MOLDING PARTS WITH PINHOLES

BACKGROUND OF THE INVENTION

1. Field of the Invention

This invention relates to injection molding. In one of its aspects, the invention relates to a mold for forming plastic parts with small pinholes. In another of its aspects, the invention relates to a method of molding plastic parts with small pinholes.

2. Description of Related Art

Plastic articles with decorative outer surfaces are made by forming plastic parts with a multitude of pinholes, placing the plastic parts in a vacuum mold, placing a decorative film, such as vinyl, on the plastic part, drawing a vacuum through the plastic parts to conform the film tightly to the shape of the plastic parts and adhesively securing the film to the plastic parts. Typically, the pinholes are made in the plastic parts during an injection-molding process. The mold cavity has a multitude of cylindrical pins extending from one mold surface so that the pins are in contact with the mating mold surface. Thus, one pinhole is formed for every pin.

The pins sometimes wear or break, resulting in the formation of plastic where a pinhole should be. The parts thus formed require very careful inspection of each plastic part to make sure that all of the pinholes have been formed. If the pinholes have not been formed, they require drilling or scrapping of the parts. Frequently, a pin will break during a molding process but the breakage will not be detected for some time, thus resulting in the formation of a number of defective plastic parts. Thus, the present process is expensive in that it is labor intensive and is somewhat imprecise in that imperfect plastic parts are frequently made.

SUMMARY OF THE INVENTION

The invention relates to a mold for molding thermoplastic parts wherein first and second mold halves each have a mating surface and a mold cavity formed in at least one of the mold halves to define the shape of a plastic part. A sprue opening is typically provided in at least one of the mold halves in communication with the mold cavity. At least one of the mold halves further has a plurality of projections in the mold cavity to form small holes in the plastic part during the molding operation. According to the invention, the projections are in the shape of tapering, three-dimensional shapes which have small apices which extend to a point near to but spaced from the confronting surface of the other mold half. The taper of the angle of the projection and the spacing between the apices of the projection and the surface of the other mold half are selected so that the molten thermoplastic freezes before it covers the apices of the projections during the molding process to thereby form pinholes in the resulting plastic part.

The angle of taper with respect to the surface of the other mold half can vary over a relatively large range, for example, 5° to 60°. Preferably, the angle of taper is about 10°.

The spacing between the apices of the projections can vary somewhat depending on the nature of the plastic part, the thickness of the plastic part and the thermoplastic material used during the molding process. The spaces between the apices of the projections and the confronting surface of the other mold half are at least 1 mm and preferably in the range of 1 to 5 mm, with 3 mm spacings being preferred.

The height of the projections can also vary over a relatively wide range, depending on the nature of the part being made and the nature of the thermoplastic material. Typically, the projections are in the range of 80 to 150 thousandths of an inch and the diameter of the projections are less than 2 inches. In a preferred embodiment of the invention, the projections are conical in shape.

Further according to the invention, a method for molding plastic parts with pinholes comprises the steps of providing a pair of mold halves which together form a mold cavity therebetween, providing in at least one of the mold halves multiple projections which extend from a first cavity in one of the mold halves toward a second cavity in the other mold half with the projections having a taper with an apex at an upper portion thereof, the apices of the projections extending near to but spaced from the second cavity surface. The mold halves are closed and thermoplastic material is injected under pressure into the cavity to fill the mold cavity except for a space between the apices of the projections and the second cavity surface.

The angle of taper of the projections and the spacing between the apices of the projections and the second cavity surface are selected so that the thermoplastic freezes off as the thermoplastic approaches the apices of the mold half during the injecting step. The taper angle of the projections is in the range of 5° to 60°, preferably about 10°. In a preferred embodiment of the invention, gas is injected into the mold cavity simultaneously with or subsequent to the injecting step.

BRIEF DESCRIPTION OF THE DRAWINGS

The invention will now be described with reference to the accompanying drawings in which:

FIG. 1 is a perspective view of a mold according to the invention and a part made by a mold according to the invention;

FIG. 2 is a plan view of a mold surface of the lower mold half; and

FIG. 3 is a cross sectional view of a portion of the mold according to the invention showing the manner of formation of pinholes in the plastic parts.

DESCRIPTION OF THE PREFERRED EMBODIMENTS

Referring now to the drawings, and to FIG. 1 in particular, there is shown an upper mold half 12 having a lower parting surface 14 which defines a cavity 16. A sprue opening 18 is provided for injection of plastic material into the mold cavity formed in part by the cavity 16 in the upper mold half 12.

The lower mold half 20 has an upper parting surface 22 which forms a cavity 24. A lower surface 26 of the cavity 24 has a plurality of conical projections 28 which are shown more clearly in FIG. 2. The plastic part 30 conforms to the shape of the lower cavity 16 formed by the upper mold half 12 and the lower mold half cavity 24. The plastic part has a plurality of pinholes 32. Each pinhole 32 corresponds to and is formed by one of the conical projections 28 in a process described hereinafter.

In FIG. 3, the mold halves are shown in the closed condition with thermoplastic injected into the cavity. As shown in FIG. 3, the plastic part 30 is formed by the mold cavity defined by the upper mold half cavity 16 and the lower mold half cavity 14. The pinholes 32 are formed at the apex of the conical projections 28. As shown in FIG. 3, the apex of the conical projections 28 extend to a point below the cavity 16. However, the plastic which is injected into the mold cavity freezes off near to the apex of the conical projections 28 to leave the pinholes 32 in the part 30.

The holes 32 are typically in the nature of 1 mm in diameter although larger or smaller holes can be made if desired. The angle of an element of the conical projections with respect to the surface of the mold cavity 16 is typically 10° but the angle can range from 5° to 60°. The height of the conical projections is typically in the range of 80–150 thousandths of an inch for plastics and the diameter of the conical projection is typically less than 2 inches. The preferred conical angle is 10°. An important feature is that the apex or tip of the conical projection 28 comes close to but ends below the surface of the upper mold half cavity 16. The distance between the upper mold half cavity surface and the apex of the conical projection can vary over a range, but typically will be in the range of about 1 to 5 mm (40–200 thousandths of an inch), preferably about 3 mm (120 thousandths of an inch).

Plastic parts are molded according to the invention by closing the mold halves 12 and 20 and clamping the two mold halves tightly together. Thermoplastic is then injected into the cavity formed by the upper and lower mold halves under pressure, preferably with a gas-assisted injection molding process to fill the cavities 16 and 24 except for those portions of the mold cavity between the apices of the projections 28 and the cavity surface 16 of the upper mold halves. The thermoplastic material, as it is injected into the mold, freezes off as it reaches the apices to leave small pinholes due to the relatively large area of the surfaces of the projections 28 and cavity 16 and the small thickness of plastic between the surfaces. After the thermoplastic material has fully solidified in the mold, the mold cavities are opened and the plastic part is then removed. The plastic part can then be taken to another operation where a decorative film is applied to the plastic part by placing the plastic part in a mold and drawing a vacuum through the pinholes 32 in the plastic part 30 with the film in contact with the plastic part. Typically, the film is secured to the plastic part by adhesives.

The invention has been described with respect to providing conical projections 28 in one mold cavity of two mold halves. The invention contemplates any shape of projection which tapers at a relatively low angle from one mold cavity towards the other and which form apices which are spaced a relatively small distance from the cavity surface of the other mold half. The taper angle of the projection and the spacing of the apices are selected so that the thermoplastic freezes off before it flows over the apices of the projections and thereby leaves small pinholes. The projections can extend down from one or both of the mold cavity surfaces in juxtaposition to each other. Conceivably, with the correct spacing between projection apices and the proper taper angle of the projections, the projections can also be in alignment with one another.

The invention provides a very cost effective way of forming a plastic part with a multitude of pinholes for drawing a vacuum through the plastic part. Parts made according to the invention have been used in automotive applications wherein parts 30 are placed in a vacuum mold and decorative film (not shown) is draped over the parts with a vacuum drawn through the pinholes 32 in the parts to draw the film tightly against the plastic parts.

The invention provides a high degree of integrity for pinholes in the final parts. Experience has shown that the formation of pinholes approaches 100% for each projection. There is no appreciable wear on the pinhole forming projections as a result of mating with the upper mold half. Thus, there is little or no necessary drilling of the final product and there is little or no maintenance on the mold due to wear on the mold during the formation of the pinholes. The invention is contrasted with the use of pins in a lower mold half which mate with the surface of the upper mold half cavity to form pinholes. Where pins break off or otherwise wear, there is a tendency to form plastic over the holes so that the holes have to be drilled and the parts require a high degree of inspection.

The parts made with the mold according to the invention can be made in any conventional injection molding process. However, it has been found that gas-assisted injection molding processes work well with the invention. With the use of the invention in a gas-assisted injection molding process, essentially no sinkholes are formed in the final plastic part.

Reasonable variation and modification are possible within the scope of the foregoing disclosure and drawings without departing from the spirit of the invention.

The embodiments of the invention in which an exclusive property or privilege is claimed are defined as follows:

1. A method for molding plastic parts with pinholes comprising the steps of:

providing a pair of mold halves which together form a mold cavity therebetween;

providing in at least one of the mold halves multiple projections which extend from a first cavity surface in one of the mold halves toward a second cavity surface in the other mold half, the projections having a taper with an apex at an upper portion thereof, the apices of the projections extending near to but spaced from the second cavity surface;

closing the mold halves; and injecting thermoplastic material under pressure into the cavity to fill the mold cavity except for a space between the apices of the projections and the second cavity surface.

2. A method of forming a plastic part according to claim 1 wherein the angle of taper of the projections and the spacing between the apices of the projections and the second cavity surface are selected so that the thermoplastic freezes off as the thermoplastic approaches the apices of the mold half during the injecting step.

3. A molding process according to claim 2 wherein the taper angle of the projections is in the range of 5° to 60°.

4. A method of molding according to claim 3 wherein the taper angle is about 10°.

5. A mold for molding thermoplastic parts comprising first and second mold halves, each with a mating surface, a mold cavity formed in at least one of the mold halves to define the shape of a plastic part and a sprue opening in at least one of the mold halves in communication with the mold cavity, at least one of the mold halves having a plurality of projections in the mold cavity to form small holes in the plastic part during molding, the improvement which comprises:

the projections are in the shape of tapering three-dimensional shapes which have small apices which extend to a point near to but spaced from a confronting surface of the other mold half, the taper angle of the projection and the spacing between the apices of the projection and the surface of the other mold half being selected so that the thermoplastic freezes before it covers the apices of the projections during the molding process to thereby form pinholes in the resulting plastic part.

6. A mold according to claim 5 wherein the angle of the taper with respect to the surface of the other mold half is in the range of 5° to 60°.

7. A mold according to claim 6 wherein the angle of the taper is about 10°.

8. A mold according to claim 6 wherein the apices of the projections are spaced at least 1 mm from the confronting surface of the other mold surface.

9. A mold according to claim 8 where the height of the projections is in the range of 80 to 150 thousandths of an inch.

10. A mold according to claim 9 where the diameter of the projections is less than two inches.

11. A mold according to claim 10 wherein the projections are conical in shape.

12. A mold according to claim 5 wherein the apices of the projections are spaced at least 1 mm from the other mold surface.

13. A mold according to claim 5 wherein the height of the projections is in the range of 80 to 150 thousandths of an inch.

14. A mold according to claim 5 wherein the diameter of the projections are less than two inches.

15. A mold according to claim 5 wherein the projections are conical in shape.

16. A mold according to claim 15 wherein the apices of the projections are spaced at least 1 mm from the other mold surface, the height of the projections is in the range of 80 to 150 thousandths of an inch and the diameter of the projections is less than two inches.

* * * * *